Nov. 24, 1931.　　　T. RIVAL　　　1,833,263

WEIGHING MACHINE

Filed Dec. 29, 1926　　　5 Sheets-Sheet 1

Inventor:
Théophile Rival
Attorney

Nov. 24, 1931.   T. RIVAL   1,833,263
WEIGHING MACHINE
Filed Dec. 29, 1926   5 Sheets-Sheet 2
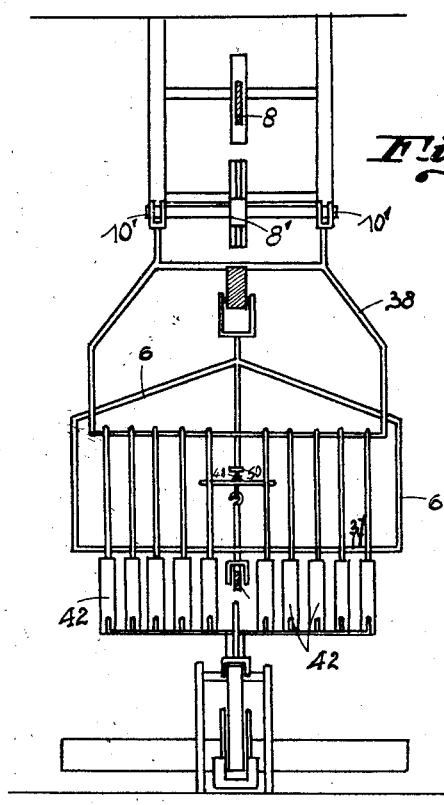
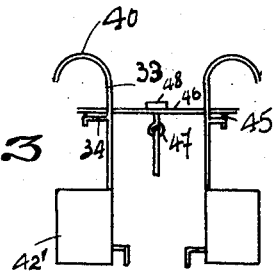
Fig.3
Fig.4.
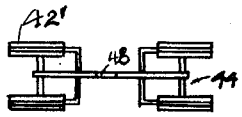
Fig.5   Fig.6.
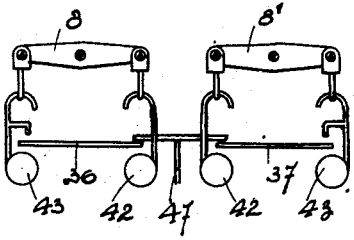
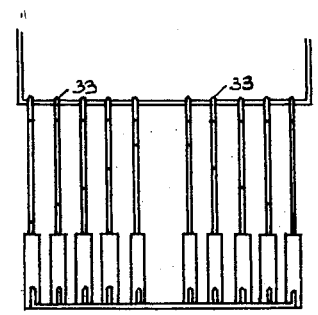
Fig.3ª
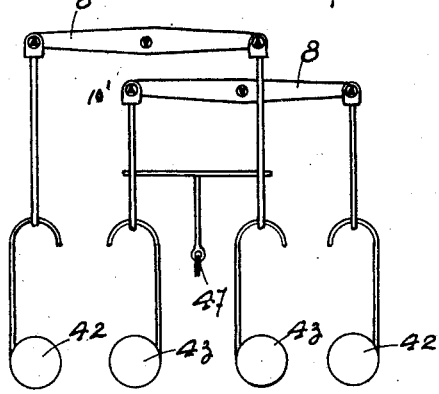
Fig.7.
Inventor:
Théophile Rival.
Attorney:

Nov. 24, 1931.   T. RIVAL   1,833,263
WEIGHING MACHINE
Filed Dec. 29, 1926   5 Sheets-Sheet 3

Inventor:
Théophile Rival
Attorney:

Nov. 24, 1931.   T. RIVAL   1,833,263
WEIGHING MACHINE
Filed Dec. 29, 1926   5 Sheets-Sheet 4

Nov. 24, 1931.   T. RIVAL   1,833,263
WEIGHING MACHINE
Filed Dec. 29, 1926   5 Sheets-Sheet 5

Inventor:
Théophile RIVAL
Attorney:

Patented Nov. 24, 1931

1,833,263

UNITED STATES PATENT OFFICE

THÉOPHILE RIVAL, OF GHENT, BELGIUM

WEIGHING MACHINE

Application filed December 29, 1926, Serial No. 157,778, and in Belgium December 29, 1925.

This invention relates to certain new and useful improvements applied on weighing machines, wherein the action of the load causes the weight scale to rise and to take up suitably suspended weights until the load is balanced, the accuracy of the poising result being increased by the improvements for which I have filed in July 15, 1925, an application No. 43,860.

The invention is illustrated in the accompanying drawings, in which:—

Figure 3 is a vertical section on line C—D of Figure 1.

Figures 3a to 7 are details showing various arrangements of the weights suspended from the auxiliary weights carrying balances.

Figure 1:
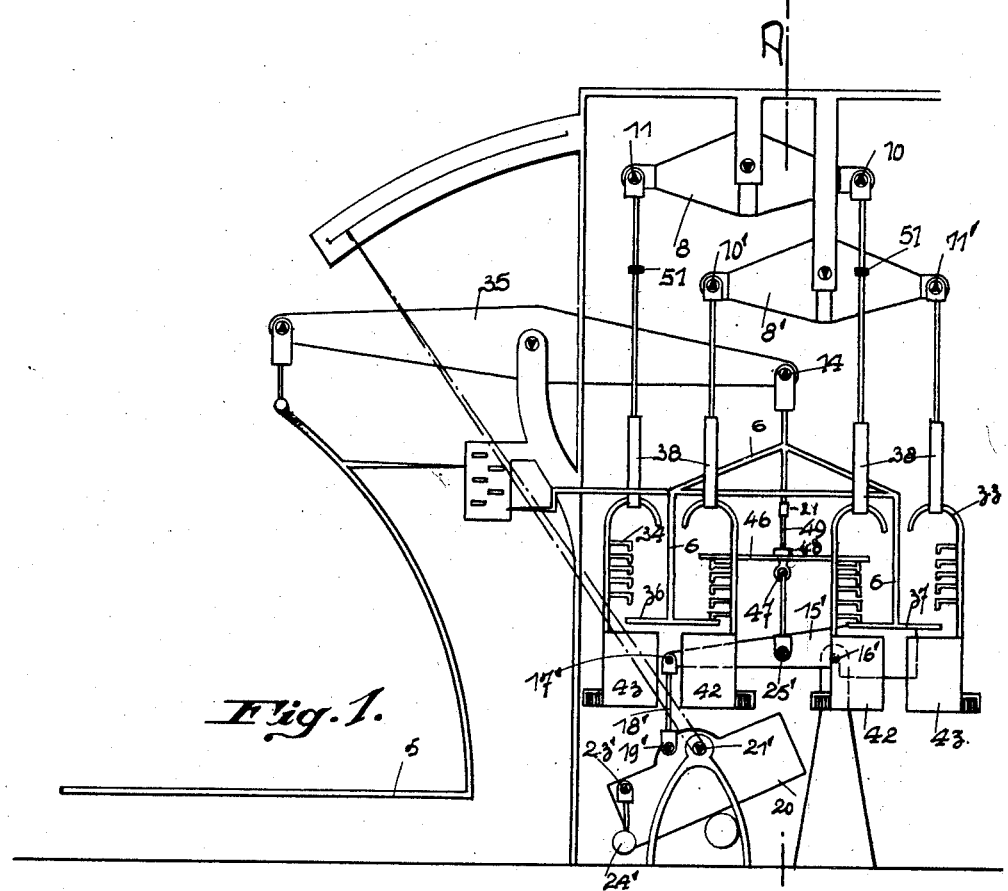
Figure 1 is a vertical section of the weighing machine according to line A—B of Figure 2.
Figure 2:
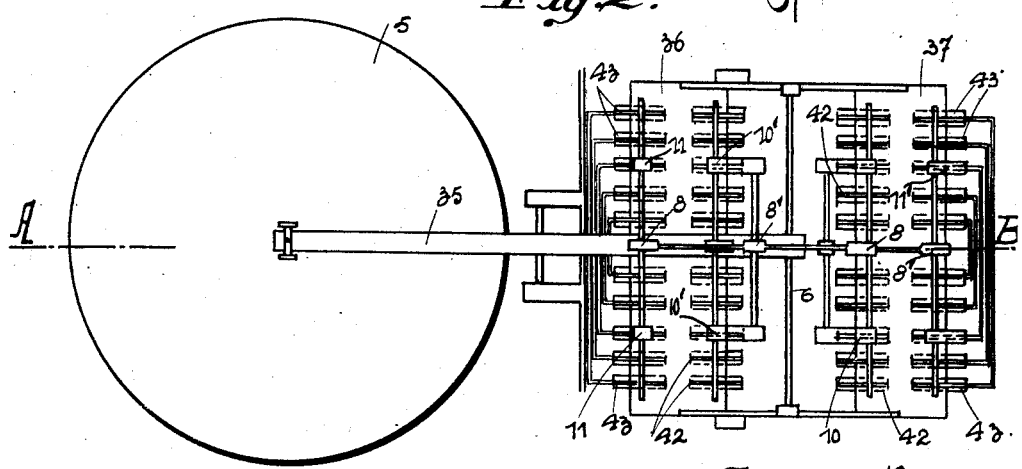
Figure 2 is a plan view of the machine.

In Figures 1 to 3, the balancing device is applied to a balance with simple beam, the weights being removed in a completely symmetric way by the weight scale.

35 is the simple beam balance, the equal or unequal arms of which support the load scale 5 on one hand and the weight scale supporting yoke 6 on the other hand. Said weight scale is formed of two equal scales 36—37 arranged symmetrically with relation to the suspension knife edge 14 of the yoke 6.

In this application I use two auxiliary balances 8—8' which are equal and have equal arms and suspended above the weight scale by means of supports secured to the frame and each supporting a series of weights suspended symmetrically from yokes 38.

Said auxiliary balances are located in the same plane as the beam 35 of the main balance and the supports thereof are secured to the frame respectively at equal distances from and on either side of a vertical plane at right angles to 35 and passing through the suspension edge of the knife 14.

Said supports are placed in different horizontal planes. The relative vertical distances between said brackets and the lower horizontal part of the frame are determined by the sizes of the supported balances and may vary, without changing the system, provided that the difference in height will be sufficient for allowing free movement of the balances. The distances between the axes of said supports in horizontal projection depends on the position of the equal plates 36 and 37 (Figure 1).

The weights are each formed of two masses, each having an upper and lateral supporting arm provided with a supporting point 34 and ending into a suspension hook 33 above the mass, the supporting points being arranged on the vertical line running through the suspension point 40 (Figure 4) on the hook 33 and at variable distances apart. The two portions forming each weight are connected in such a way that they may be placed respectively upon the yokes 38 symmetrically to the axis of suspension of the latter.

Of the two series of weights 42 and 43, the weights 43 are those which, suspended from knife edges 11, 11' of the auxiliary balances, have no direct connection with the pendulous balance. The weights 42 are those which, suspended at 10—10', are connected to the pendulous balance (as described hereinafter).

All these weights are equal to one-half of the unit to be weighed except for the weights which are connected to the pendulous balance (or the multiplying balance as will be described). For said weights $42^1$, the weight will be equal to one-half of the unit minus the weight of one-half of the arm and accessories of their connection to the multiplying balance or pendulous balance, if there is no multiplying balance.

The halves of the weights $42^1$ are connected together (Figure 5) by means of a small arm 44 connecting their supporting points and in the center of which a small knife edge 45 will be placed.

The two knife edges 45 are connected by a bar 46 carrying two small supports resting on the knife edges 45.

The plate 46 carries a lower hook 47 and an upper knife edge 48, the flat side of which is turned downwardly and parallel to the direction of the beam 35.

The supporting arms of the scale 36—37 carry (Figure 1) a central arm 49 of adjustable length carrying a knife 50, the sharp edge of which is turned downwardly and at right angles to the beam 35.

A lever 15', arranged below the scale 36—37 and having its supports 16' secured to the frame, balances by itself the supports and connecting hooks of a pendulous balance 20. The lever is arranged below the scales 36—37 in such a way that its knife 25' will be located in the vertical plane passing through the knife edge 14 of the main balance. Said lever 15' with unequal arms serves merely to multiply the stroke of the scale 36—37 for a weight of the value of one unit. The same is connected on one hand to the hook 47 of the connection 46 of the weights $42^1$ and on the other hand to a pendulous balance 20 (by means of knife edge 17', link 18' and knife edge 19').

The pendulous beam 20 is also arranged below the scale 36—37 and has its bearings secured to the frame, said balance being arranged in such a way that its knife edge 19' and the knife edge 17' of lever 15' will be in the same vertical plane when starting.

The system thus formed is so arranged that, at the starting of the balance, the two weights 42 will be flush with the scale 36—37, the two weights 43 then being at a distance $2\alpha + \delta$ apart from the same scale and the knife edge 50 of the scale 36—37 being flush with the knife 48 of the connection 44—45—46 of the weights $42^1$, $\alpha$ being the vertical displacement of the scale 36—37 when exerting a tension on the pendulous lever equal to one weight unity, being the upward movement occurring after each removal of weights, said system working in the same manner as that described in my prior application.

Figures 10, 12:
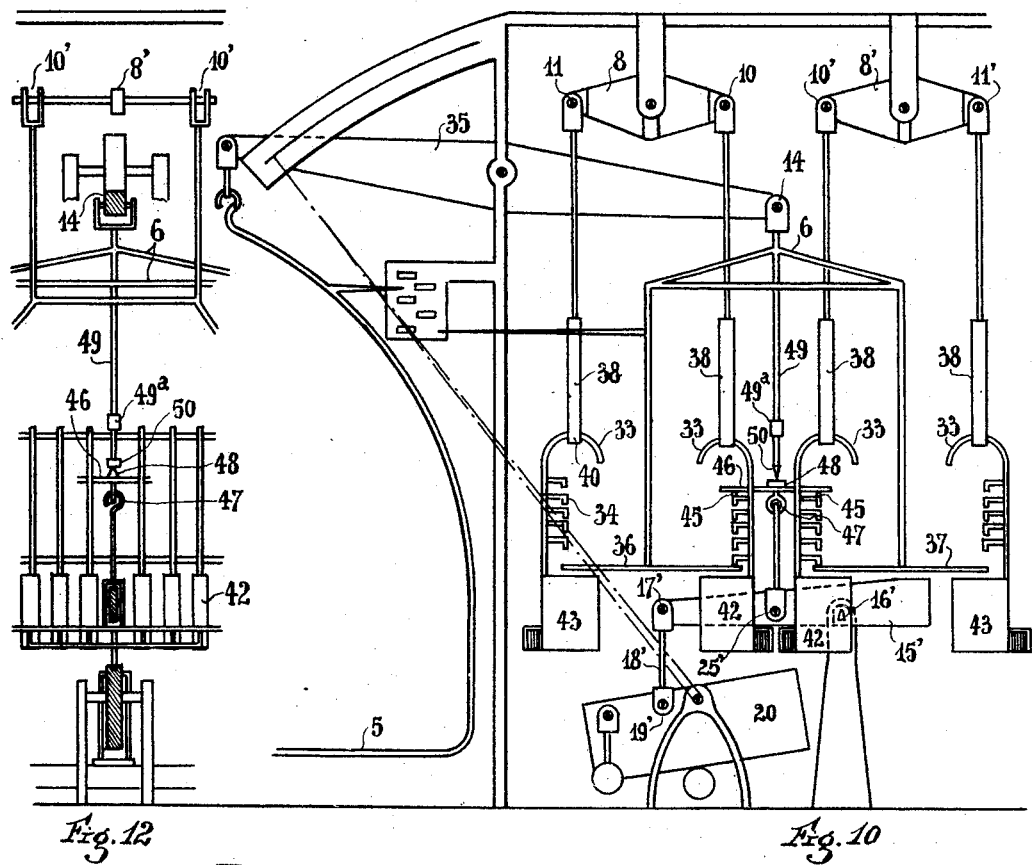
Figures 10 to 12 show respectively a lateral view, a plan view partly in section, and a front view of the modification.
Figure 11:
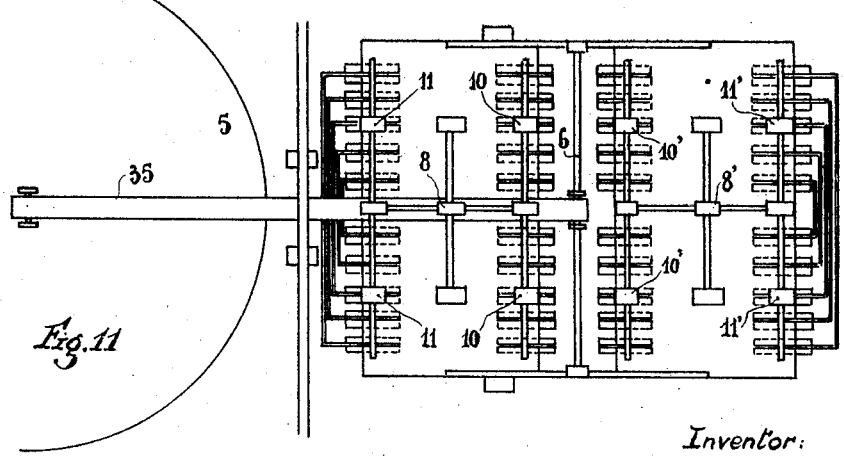

The auxiliary balances 8, 8' may be arranged both in the same vertical plane as the beam 35 and at the same time in a common horizontal plane. In this case the distance between the supports may be determined at will, but should be somewhat larger than the corresponding width of the plates 36—37 plus four times the distance between the vertical lines passing the one through the suspension point of the weights on the yoke and the other through the side part of the suspension arms of said weights (see Figure 10).

The connection 44—45—46, instead of being attached to the weights, may be attached by a similar arrangement to arms suspended at 10, 10' from the balances 8—8' (Figure 7).

Figure 8:
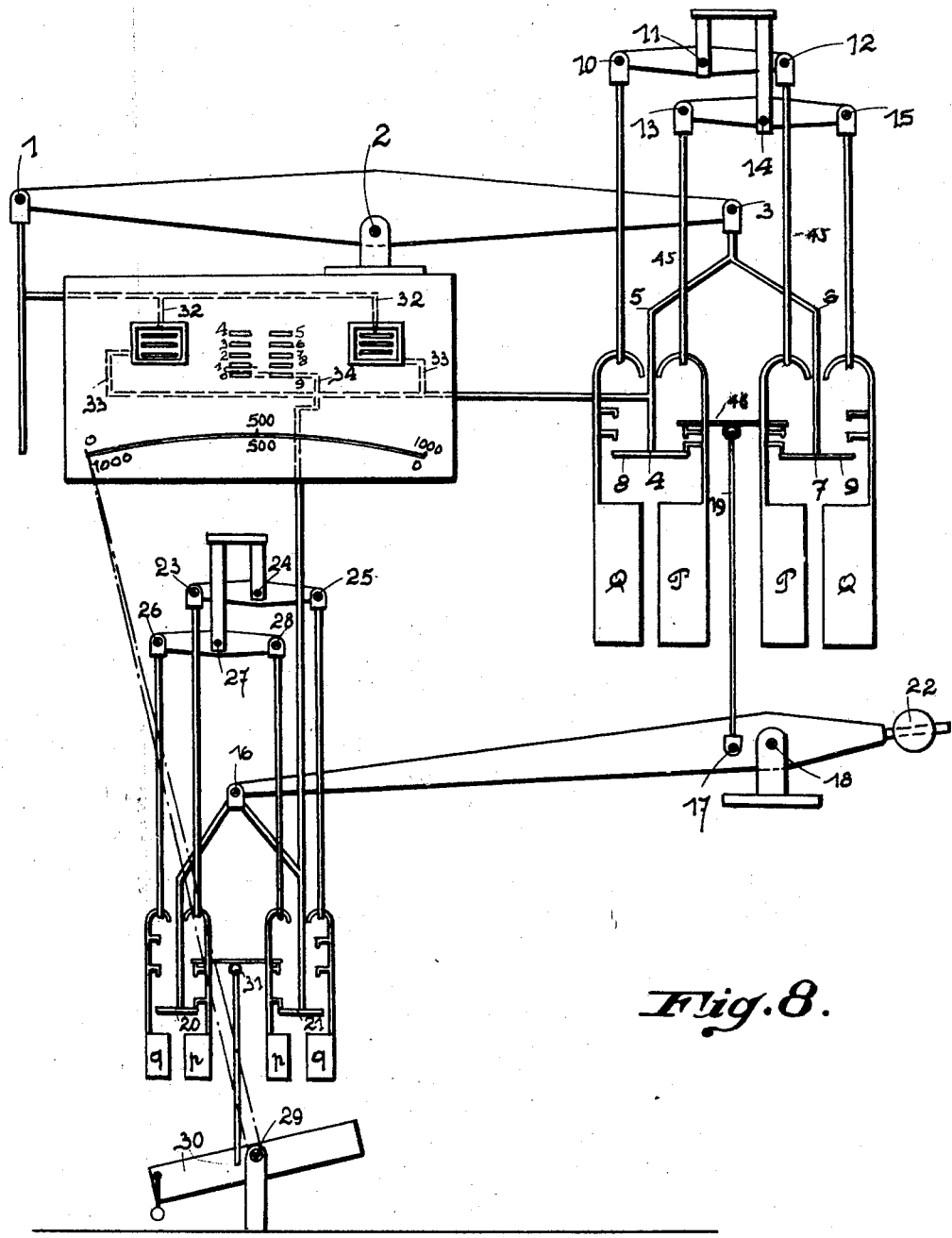
Figure 8 shows a weighing bridge for 35 units.

Figure 8 shows a weighing bridge for 35 weighing units formed of a combination of two weighing devices according to Figures 1 to 3.

The weighing bridge is formed of a balance beam 1, 2, 3 fulcrumed at 2 on the frame and supporting at 1 the load plate (not shown) or connected at 1 to the connecting rod of a weighing bridge or the like weighing machine and at 3 the weights scale comprising two equal plates 8 and 9 carried on the supporting branches 4, 5, 6, 7 in such a manner that said plates are symmetrically disposed with respect to the knife edge 3 of the weight scale.

Above the weight scale are disposed two equal auxiliary balance beams 10, 11, 12 and 13, 14, 15 suspended from supports fixed in the frame and carrying each on their respective ends 10, 15 and 12, 13 a series of weights P and a series of weights Q symmetrically disposed on yokes. Said weights are formed and disposed as in the preceding devices described, each of said weights weighing one-half of the multiple to be read on the weight indicating board.

16, 17, 18 (Figure 8) show a multiplying lever or balance disposed in the scale as above, fulcrumed on the frame at 18. This lever is connected, as above, to the hook 19 of the weight connecting means, while at 16, instead of being connected directly to the pendulous lever, it carries a weight scale formed of two plates 20, 21 similar to the scale 8, 9 but of smaller size.

The lever 16, 17, 18 with its scale 20, 21 and supporting branches of the latter is balanced by a counterweight 22. Two further auxiliary balances 23, 24, 25 and 26, 27, 28 are located above the weight scale 20, 21 in a similar manner as the balances 10, 11, 12 and 13, 14, 15 are disposed above the weight scale 8, 9. Said balances support respectively at their ends 23, 28 and 25, 26 a series of weights $p$ or a series of weights $q$ symmetrically disposed on yokes. Said weights $p$ and $q$, constructed and disposed as above described, should each be able to balance at 16 one-half of the weight unit.

The distance between the supporting pins of the weights is obtained as in my previous devices, taking in account that:

$\alpha$ being the displacement, in vertical projection, of the weights scale, corresponding to the chosen multiple.

$\alpha'$ the displacement, in vertical projection, of the weights scale of the multiplying balance at 16 for the unit.

$\delta'$ a free movement chosen for the reading of the units.

$\tau$ the ratio of the arms of the multiplying balance for 5 units, it results the following relation:

$$\alpha \times \tau = 4(\delta' + \alpha') + \alpha'$$

A pendulous lever is provided, fulcrumed on the frame at 29 and connected at 30 to a hook 31 secured on the connecting member of the weights p, as previously explained. The balance is adjusted at the beginning of the weighing so that the weights are conveniently disposed with respect to each of the weight scales 8, 9 and 20, 21.

The pulling action of the load on the end l of the beam 1, 2, 3 raises the scale 8, 9 which, raising the weights Pn, raises at the same time the multiplying lever which transmits this raising motion to the weights pn by the intermediary of the scale 20, 21. These weights pn being connected to the weights p which exert on the pendulous lever a pull, the limit of which attains the weight unit.

This pull being produced, the first the weights p (pn) are taken up by the scale 20, 21 and so on. If the weights charge taken up by the scale 20, 21 and the pull of the pendulous lever on the last of said weights have together attained the value of the desired multiple, the two first weights P (pn) will in turn be taken up by the scale 8, 9 and for a larger charge two weights Q will move downward the multiplying lever which thus abandons successively the weights p, q, taken up by the scale 20, 21 and so on for the increasing charges, until the latter system has moved back to zero, a still larger charge causing a renewed pull and so on.

The main balance moves as in the before described devices of this class, that is, according to a periodical motion comprising two periods α δ, α δ.

The multiplying balance performs an ascensional periodical motion comprising two periods α' δ', α' δ', α' δ', α' until the limit of pulling of the chosen multiple is attained; this upward motion being followed by a periodical downward motion comprising two periods α' δ', α' δ', α' δ', α' for the following multiple and so on alternately.

Two weights disposed on each of the auxiliary balances will give five units. Conveniently this number should not be passed for the units, the units 0, 1, 2, 3, 4 being indicated by the upward motion plus the number 1000 indicated on the dial of the decimals and the units 5, 6, 7, 8, 9 by the downward motion plus 1000 on the dial of the decimals.

Figure 8 shows the reading arrangement readily obtained by the motion of the weights.

The desired multiplying to be given to the multiplying balance 16, 17, 18 and the determination of the distances between the supporting pins may be obtained at will and consists in having the multiples indicated on a board having the open slots disposed alternately on either side of a central space, the indications being made by a bicolored index 33 movable at the back side of the board 32, whereby only one color is visible at the time.

The board may be fixed on the frame or connected with the load scale, whereas the movable index is connected to the support of the scales 8, 9 in a similar manner as for the units in the previously described devices. The color of the index for the multiples is determinative for the color of the units to be read.

For the units, the indicating system is the same, except that the indication being given alternately from bottom to top and from top to bottom, the bicolored index 34 permits to perceive each time both colors and indicates two different unit numbers, one for each color. The colors of both indexes correspond so that the O (at the left hand side of the board I in Figure 9) corresponds to the first upward motion of the left hand units board (2), the color of the index being the same; the O (at the right hand side of the board (I)) corresponds to the downward motion (right hand part) of the units board (2). The color of the multiple is determinative for the unit to be read, the latter being always on the same side as the decimals.

Figure 9:
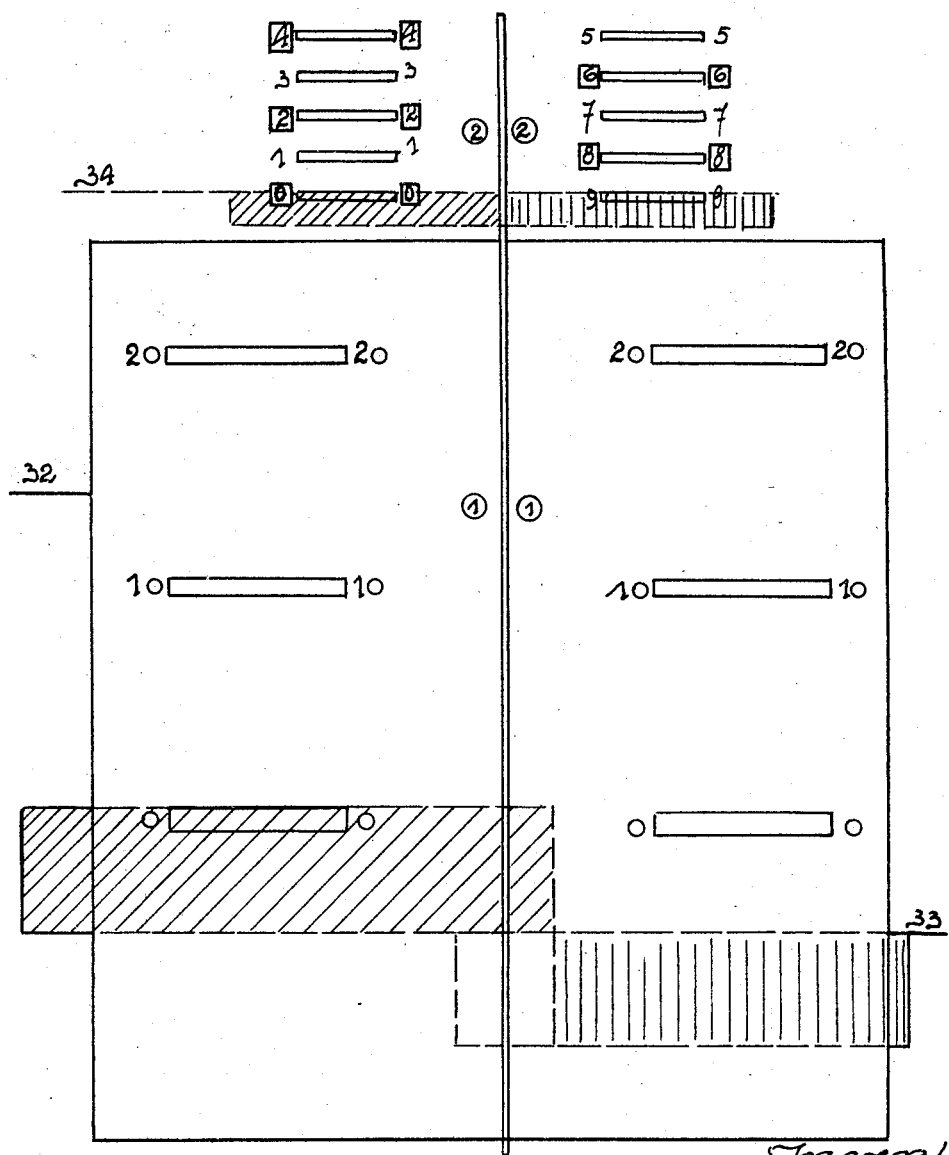
Figure 9 shows the board used in connection with the weighing bridge according to Figure 8 for the reading of the poising results.

Concerning the decimals, as they should be read alternately from the left to the right hand side and from the right to the left hand side, the numbers indicating the units will be of the same color as that of the decimals, of course these two colors should differ from the preceding ones or be of a different type, such as for instance shown in Figure 9.

Having now fully described my said invention, what I claim and desire to secure by Letters Patent, is:

1. A weighing machine comprising a frame, a single beam balance fulcrumed on said frame, a load receiving device connected to one end of said single beam, a weight scale suspended from the opposite end of said beam, two auxiliary weights carrying single beam balances fulcrumed on the frame, just above the weight scale of the main balance, equal arms at each end of the beams of said auxiliary balances, yokes suspended from said arms, four series of weights freely and symmetrically suspended from said yokes by their hooked stems, supporting pins on each of said hooked stems, a pendulum balance, a connection for said pendulum balance comprising a lever adapted to swing on the frame and having at its opposite end means connecting it to the said pendulum balance, means connecting said lever at an intermediate point to said auxiliary balances through said weights, and means for reading on a board the units and on a dial the fraction of unit of the weighing operation.

2. In a weighing machine of the kind described, a frame, a single beam balance fulcrumed on said frame, a load receiving device connected to one end of said single beam, a weight scale suspended from the opposite end of said beam, two auxiliary weights carrying single beam balances fulcrumed on the frame, just above the weights scale of the main balance, equal arms at each end of the beams of said auxiliary balances, yokes suspended from said arms, four series of weights freely and symmetrically suspended from said yokes by their hooked stems, each weight corresponding to half the multiple of the unit to be read, supporting pins on each of said hooked stems, connections between two weights, one of each auxiliary balance, a pendulum balance, a multiplying balance beam fulcrumed on said frame, a connecting rod between said multiplying beam and the weights, a second smaller weights scale disposed at the free end of said multiplying beam, connecting means between said weight scale and said pendulum balance, a counterweight on the other end of said beam for balancing same together with the smaller weight scale, two further auxiliary weights carrying balances supported on the frame above the smaller weights scale, yokes suspended from each end of said balances, four series of weights freely and symmetrically suspended by their hooks from said yokes, each weight corresponding to half the full poise to be indicated by the pendulum balance, and being suspended by their hooks above the weights scale in stirrups in which they may be raised, connections between two weights, each of the latter on one of the auxiliary balances, and means permitting the reading in units and multiples of the units on slotted boards and the fraction of the unit on dials fixed on the frame.

3. In a weighing machine, means for permitting the reading in units and multiples of the units on slotted boards and the fractions of the unit on dials, said means comprising two equal and equally numerated boards, a row of apertured grooves on each of said boards, connecting branches between said boards and the rod transmitting the action of the load to the main balance, said boards disposed so as to move respectively left and right of the vertical line dividing in two portions the reading device, two differently colored rectangular indexes fixed on branches connected to the main weights scale and arranged respectively behind said boards, the left one above, the right one below the said vertical line, so as to be visible through one groove during the weighing of each unit multiple and this alternately left and right for the successive ones, the free move of the main balance being permitted by the disposition of the supporting pins of the weights, causing the change of the side and of the color, two further boards fixed together on the frame, one on each side of the middle of the reading device, a row of apertured grooves equally disposed, but not equally numerated, disposed on said further boards, the left being numerated from bottom to top, and the right from top to bottom, numbers applied on said boards in two different colors, one color for the zero and the even units, one other for the odd units, a bi-color index with on each side the same color as the multiple index moving behind said fixed boards and being connected to the units weights scale hanging from the end of the multiplying lever, this index being disposed so as to show, during the weighing of one unit, two colors on two corresponding grooves, left and right, the color of the index of the multiple shown being determinative for the side and color to consider on the units board, a dial with two opposite graduations differently colored, the colors of which correspond to those of the numbers of the units boards, a pendulous lever, a pointer secured on the pendulous lever moving in front of said dial from left to right and from right to left, to show the decimals, the color of the unit number being determinative for the decimals to be read.

In testimony whereof I have hereunto set my hand.

THÉOPHILE RIVAL.